United States Patent
Pan et al.

(10) Patent No.: US 9,807,604 B2
(45) Date of Patent: Oct. 31, 2017

(54) AREA-BASED LOCATION PRIVACY MANAGEMENT

(71) Applicants: INTEL CORPORATION, Santa Clara, CA (US); Xiaoyong Pan, Shanghai (CN); Justin Lipman, Shanghai (CN); Yuhuan Huang, Shanghai (CN); Yong Jiang, Shanghai (CN); Ke Ding, Shanghai (CN); Dzinh J. Nguyen, Folsom, CA (US); Robert A. Colby, Granite Bay, CA (US)

(72) Inventors: Xiaoyong Pan, Shanghai (CN); Justin Lipman, Shanghai (CN); Yuhuan Huang, Shanghai (CN); Yong Jiang, Shanghai (CN); Ke Ding, Shanghai (CN); Dzinh J. Nguyen, Folsom, CA (US); Robert A. Colby, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,641

(22) PCT Filed: Jul. 19, 2013

(86) PCT No.: PCT/CN2013/079698
§ 371 (c)(1),
(2) Date: Dec. 27, 2013

(87) PCT Pub. No.: WO2015/006978
PCT Pub. Date: Jan. 22, 2015

(65) Prior Publication Data
US 2016/0255497 A1    Sep. 1, 2016

(51) Int. Cl.
*H04W 12/02* (2009.01)
*H04W 4/02* (2009.01)
(Continued)

(52) U.S. Cl.
CPC .......... *H04W 12/02* (2013.01); *H04B 17/318* (2015.01); *H04W 4/02* (2013.01);
(Continued)

(58) Field of Classification Search
CPC . H04W 12/02; H04W 4/025; H04W 72/1247; H04W 88/08; H04W 12/08; H04B 17/318; G06F 2221/2111; H04L 63/107
See application file for complete search history.

(56) References Cited

U.S. PATENT DOCUMENTS 5,588,009 A     12/1996  Will
6,327,535 B1    12/2001  Evans et al.
(Continued)

FOREIGN PATENT DOCUMENTS

CN    1747386 A    3/2006
EP    1217857 A2   6/2002
(Continued)

OTHER PUBLICATIONS

International Search Report and Written Opinion received for International Application No. PCT/CN2013/079698, dated Apr. 30, 2014, 13 pages.

*Primary Examiner* — Chuong A Ngo
(74) *Attorney, Agent, or Firm* — Barnes & Thornburg LLP

(57) ABSTRACT

Technologies for location privacy management include a mobile computing device to determine whether an application is authorized to obtain the location of the mobile computing device based on a determined location and location access policy of the mobile computing device. The location access policy includes policy rules that identify whether the application is authorized to obtain the location of the mobile computing device. If the mobile computing device determines that the application is not authorized to
(Continued)

obtain the location of the mobile computing device, the mobile computing device blocks the application from obtaining the location.

25 Claims, 6 Drawing Sheets

(51) Int. Cl.
    *H04W 12/08*     (2009.01)
    *H04B 17/318*     (2015.01)
    *H04W 72/12*     (2009.01)
    *H04W 88/08*     (2009.01)

(52) U.S. Cl.
    CPC ........... *H04W 4/025* (2013.01); *H04W 12/08* (2013.01); *H04W 72/1247* (2013.01); *H04W 88/08* (2013.01)

(56) References Cited

U.S. PATENT DOCUMENTS

| | | |
|---|---|---|
| 6,499,110 B1 | 12/2002 | Moses et al. |
| 6,505,048 B1 | 1/2003 | Moles et al. |
| 6,571,279 B1 | 5/2003 | Herz et al. |
| 6,594,483 B2 | 7/2003 | Nykanen et al. |
| 6,675,017 B1 | 1/2004 | Zellner et al. |
| 6,678,827 B1 | 1/2004 | Rothermel et al. |
| 6,886,101 B2 | 4/2005 | Glazer et al. |
| 6,938,155 B2 | 8/2005 | D'Sa et al. |
| 7,054,648 B2 | 5/2006 | Abtin et al. |
| 7,093,286 B1 | 8/2006 | King |
| 7,100,204 B1 | 8/2006 | Myllymaki et al. |
| 7,145,437 B2 | 12/2006 | Jalkanen et al. |
| 7,194,760 B2 | 3/2007 | Nordman et al. |
| 7,203,752 B2 | 4/2007 | Rice et al. |
| 7,206,744 B2 | 4/2007 | Suryanaraya |
| 7,206,791 B2 | 4/2007 | Hind et al. |
| 8,046,164 B1 | 10/2011 | Burch |
| 2002/0035605 A1 | 3/2002 | McDowell et al. |
| 2002/0174073 A1 | 11/2002 | Nordman et al. |
| 2004/0102197 A1 | 5/2004 | Dietz |
| 2004/0203900 A1 | 10/2004 | Cedervall et al. |
| 2005/0003804 A1 | 1/2005 | Huomo et al. |
| 2005/0060575 A1 | 3/2005 | Trethewey et al. |
| 2006/0046744 A1 | 3/2006 | Dublish et al. |
| 2011/0023115 A1* | 1/2011 | Wright .................. G06F 21/552 726/22 |
| 2011/0078758 A1 | 3/2011 | Kohlenberg et al. |
| 2011/0173545 A1* | 7/2011 | Meola ................ G06F 21/6218 715/743 |
| 2012/0159172 A1* | 6/2012 | Saxena .................... G06F 21/57 713/171 |
| 2013/0326629 A1 | 12/2013 | Trethewey et al. |
| 2014/0298324 A1* | 10/2014 | Voronkov ................ G06F 8/61 717/178 |

FOREIGN PATENT DOCUMENTS

| | | |
|---|---|---|
| WO | 03065754 A1 | 8/2003 |
| WO | 2006106303 A1 | 10/2006 |

* cited by examiner

_(12) United States Patent_

AREA-BASED LOCATION PRIVACY MANAGEMENT

CROSS REFERENCE TO RELATED APPLICATIONS

This application is a national stage entry under 35 USC §371(b) of International Application No. PCT/CN2013/079698, which was filed Jul. 19, 2013.

BACKGROUND

Location-based services continue to be integrated into countless applications for mobile computing devices to deliver better and smarter services to users. The location information of the mobile computing devices can be obtained through numerous methods, such as using cellular tower identification, Wi-Fi and/or Bluetooth signals, internet protocol (IP) based geocoding, and/or global positioning systems (GPS). The numerous ways in which an application of a mobile computing device can obtain the location of the mobile computing device poses significant challenges with respect to protecting the confidentiality of a user's location.

Social media applications may leak a user's location either intentionally or unintentionally through, for example, user error, user interface designs, and/or other mechanisms. For example, a user may intentionally allow an application to access the location of the mobile computing device for a particular purpose (e.g., finding a nearby restaurant) and also unknowingly permit the application to access the location of the mobile computing device at any time in the future without permission. After doing so, the user may not have the technological savvy to manually change the location access settings. Alternatively, a user may unintentionally select an option to permit an application to obtain the location of the mobile computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
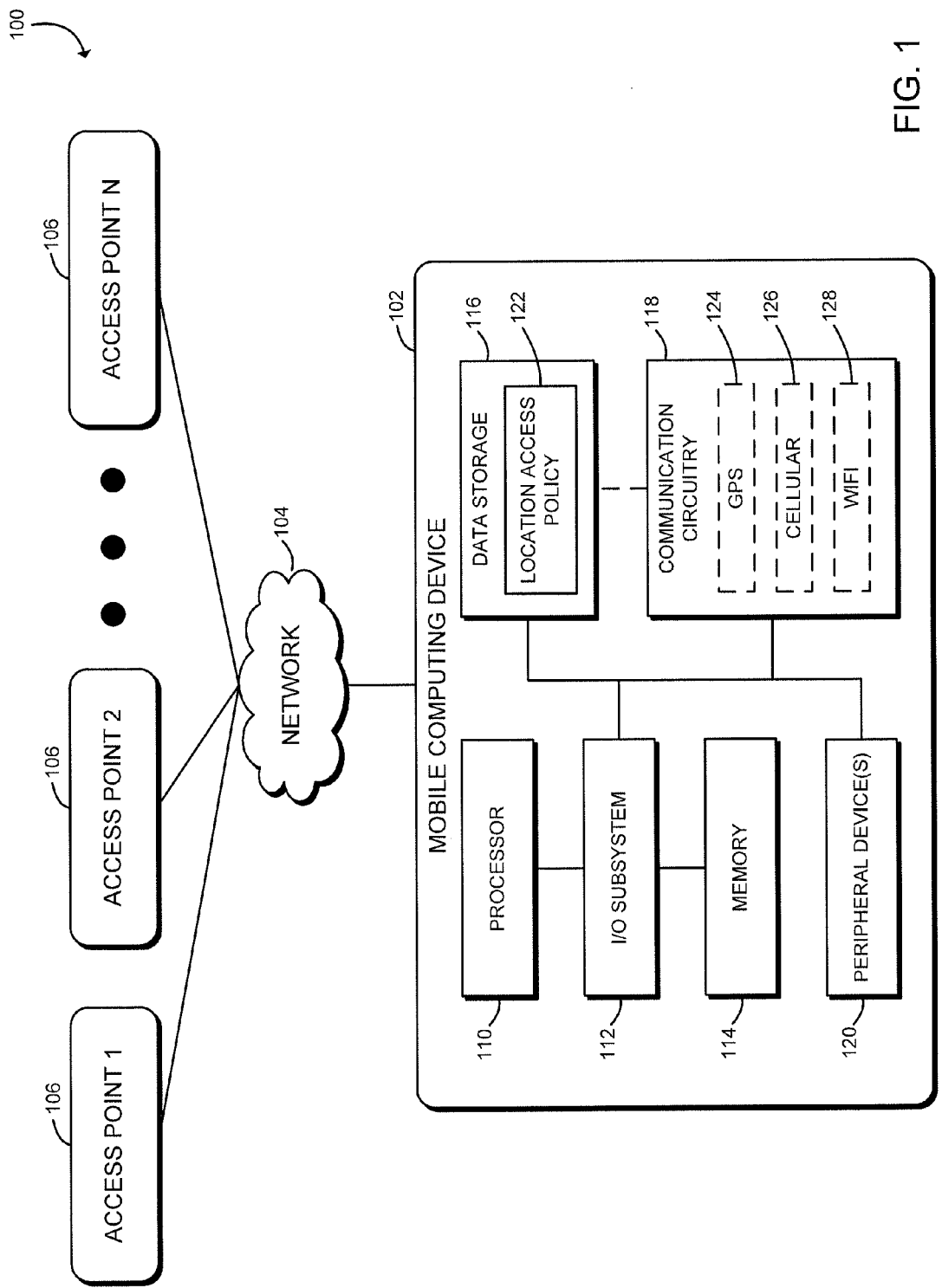
FIG. 1 is a simplified block diagram of at least one embodiment of a system for location privacy management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for location privacy management includes a mobile computing device 102, a network 104, and a plurality of access points 106. In use, as discussed in more detail below, the mobile computing device 102 may determine whether an application of the mobile computing device 102 requesting access to the location of the mobile computing device 102 is authorized to obtain the corresponding location data. If the application is not authorized to obtain the location, the mobile computing device 102 may block the application from obtaining the corresponding location data. Further, the mobile computing device 102 may prevent the application from obtaining network scan data (e.g., Wi-Fi scan results), which could potentially be used to determine the location of the mobile computing device 102.

The mobile computing device 102 may be embodied as any type of computing device capable of determining its location and performing the functions described herein. For example, the mobile computing device 102 may be embodied as a cellular phone, smartphone, tablet computer, laptop computer, personal digital assistant, mobile Internet device, desktop computer, and/or any other computing/communication device. As shown in FIG. 1, the illustrative mobile computing device 102 includes a processor 110, an input/output ("I/O") subsystem 112, a memory 114, a data storage 116, a communication circuitry 118, and one or more peripheral devices 120. Of course, the mobile computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 102 such as operating systems, applications, programs, libraries, and drivers. The memory 114 is communicatively coupled to the processor 110 via the I/O subsystem 112, which may be embodied as circuitry and/or components to facilitate' input/output operations with the processor 110, the memory 114, and other components of the mobile computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. As shown in FIG. 1, the data storage 116 includes a location access policy 122. As discussed below, the mobile computing device 102 may establish a location access policy 122 including one or more location access policy rules 214 defining circumstances and/or an extent (e.g., the level of specificity, accuracy, and/or precision) to which various applications are authorized to access the location or location data of the mobile computing device 102.

The communication circuitry 118 of the mobile computing device 102 may be embodied as any communication circuit, device, or collection thereof, capable of enabling communications between the mobile computing device 102 and other remote devices (e.g., the access points 106) over the network 104. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication. As shown in FIG. 1, the communication circuitry 118 may include GPS circuitry 124, cellular circuitry 126, and/or Wi-Fi circuitry 128, which permit the communication circuitry 118 to communicate with remote computing devices using the corresponding communication technologies. For example, the GPS circuitry 124 may permit the mobile computing device 102 to communicate with satellites and/or other space-based or airborne objects to identify the location of the mobile computing device 102. The cellular circuitry 126 may permit the mobile computing device 102 to communicate with remote computing devices over a cellular or mobile network. Additionally, the mobile computing device 102 may use the Wi-Fi circuitry 128 to connect to and otherwise communicate with Wi-Fi access points. It should be appreciated that, in some embodiments, any one or more of the GPS circuitry 124, the cellular circuitry 126, the Wi-Fi circuitry 128, and/or other communication circuitry 118 may be used to determine the location of the mobile computing device 102.

In some embodiments, the mobile computing device 102 may communicate with network access points other than Wi-Fi access points. As discussed below, the mobile computing device 102 may, in some embodiments, identify the locations of the access points 106 and, in turn, identify the location of the mobile computing device 102 based on the locations of the access points 106 (e.g., via trilateration techniques).

The one or more peripheral devices 120 of the mobile computing device 102 may include any number of additional peripheral or interface devices. The particular devices included in the peripheral devices 120 may depend on, for example, the type and/or intended use of the mobile computing device 102.

The network 104 may be embodied as any type of telecommunication network capable of facilitating communication between the mobile computing device 102 and the access points 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, a short-range communication network or link, or any combination thereof.

The system 100 also includes a number of access points 106, which are embodied as network access points (e.g., Wi-Fi® access points). As indicated above, in some embodiments, the locations of the access points 106 may be used to determine the location of the mobile computing device 102 via trilateration. As such, the access points 106 may be embodied as any computing device having a recorded or otherwise known physical location. In some embodiments, the locations of the access points 106 may be retrieved from a database stored on the mobile computing device 102 and/or a remote computing device. Depending on the particular embodiment, relative location data regarding the access points 106 (e.g., location relative to another known location), absolute location data regarding the access points 106 (e.g., latitudinal-longitudinal geodetic coordinates), and/or a combination thereof may be retrieved by the mobile computing device 102 to determine the location of the mobile computing device 102. Of course, as described herein, the mobile computing device 102 may determine the location of the mobile computing device 102 using other algorithms, mechanisms, and systems (e.g., using the GPS circuitry 124).

Each of the access points 106 may be embodied as any type of computing device capable of communicating with the mobile computing device 102 and performing the functions described herein. For example, each access point 106 may be embodied as a server, router, network bridge, web portal device, desktop computer, cellular phone, smartphone, tablet computer, laptop computer, personal digital assistant, mobile Internet device, and/or any other computing/communication device. Further, the access points 106 may include components similar to those of the mobile computing device 102 as described above. The description of those components of the mobile computing device 102 is equally applicable to the description of components of the access points 106 and is not repeated herein for clarity of the description. Further, it should be appreciated that the access points 106 may include other components, sub-components, and devices commonly found in a computing device, which are not discussed above in reference to the mobile computing device 102 and not discussed herein for clarity of the description. Additionally, the access points 106 may include components different from, or fewer than, those of the mobile computing device 102. For example, each access point 106 may or may not include peripheral devices 120. Further, although only one mobile computing device 102 and one network 104 are illustratively shown in FIG. 1, the system 100 may include additional mobile computing devices 102 and networks 104 in some embodiments.

Figure 2:
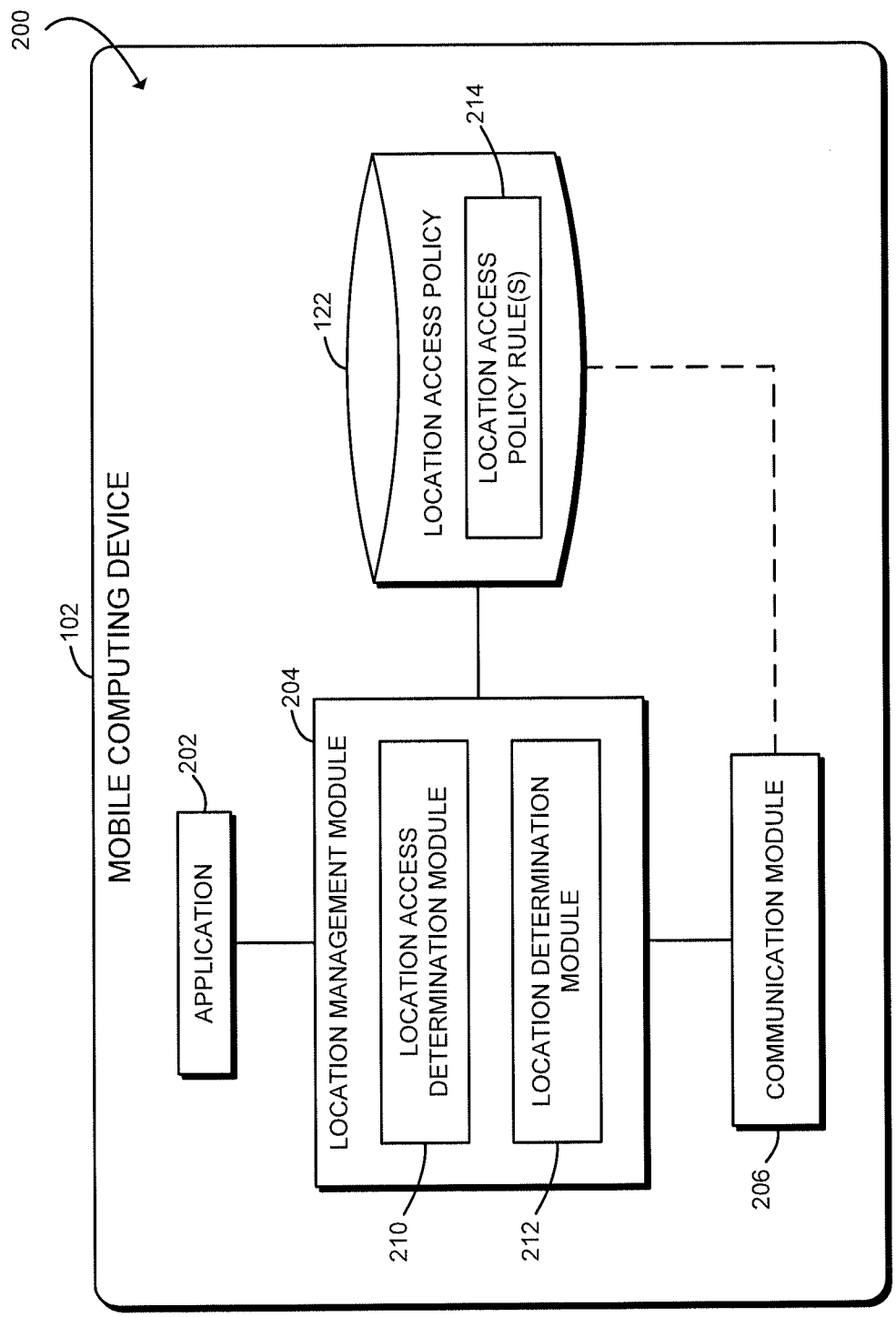
FIG. 2 is a simplified block diagram of at least one embodiment of an environment of a mobile computing device of the system of FIG. 1.

Referring now to FIG. 2, in use, the mobile computing device 102 of the system 100 establishes an environment 200 for location privacy management. The environment 200 in the illustrative embodiment includes an application 202, a location management module 204, and a communication module 206. Additionally, the location management module 204 includes a location access determination module 210 and a location determination module 212. Each of the location management module 204, the communication module 206, the location access determination module 210, and the location determination module 212 may be embodied as hardware, software, firmware, or a combination thereof.

As discussed in more detail below, the application 202 may request the location of the mobile computing device 102. In some embodiments, the application 202 may include an internet browser application, such as a hypertext markup language 5 (HTML5) or JavaScript application; a browser plug-in; or a standalone application (e.g., C, Java, etc.) running on the mobile computing device 102. The application 202 may be programmed in any language that would permit the functions described herein. Although the application 202 in FIG. 2 is embodied as a single application 202, the application 202 may be embodied as multiple applications 202 in other embodiments. Additionally, the environment 200 may include additional applications in some embodiments.

The location management module 204 handles requests for the location of the mobile computing device 102 and/or requests for network scan data by the application 202. For example, in some embodiments, the location management module 204 handles all requests for the location of the mobile computing device 102, network scan data, and/or other location data of the mobile computing device 102. As indicated above, the location management module 204 includes the location access determination module 210 and the location determination module 212. The location access determination module 210 determines whether the application 202 is authorized to obtain the location of the mobile computing device 102 (or location data corresponding to the location) based on the one or more location access policy rules 214 of the location access policy 122. That is, the location access policy 122 may define the circumstances and/or extent to which each application 202 may obtain the location of the mobile computing device 102. For example, the location access policy 122 may identify whether the application 202 is authorized to obtain the location of the mobile computing device 102 based on the current location of the mobile computing device 102. It should be appreciated that the location of the mobile computing device 102 may be defined as a geodetic or relative point in space in various embodiments. Further, in some embodiments, the location access policy 122 may be represented as a table or similar data structure such as that of Table 1, which identifies whether the application 202 may obtain the location of the mobile computing device 102 based on the current location of the mobile computing device 102.

TABLE 1

Location Access Policy Authorizations

| | Application 1 | Application 2 | Application 3 | Application 4 |
|---|---|---|---|---|
| Location 1 | Yes | Yes | Yes | Yes |
| Location 2 | Yes | No | No | No |
| Location 3 | No | No | No | No |

Further, in some embodiments, the location access policy 122 identifies a level of specificity at which the application 202 may obtain the location of the mobile computing device 102. For example, one application 202 may be authorized to access location data corresponding to the location of the mobile computing device 102 having fine granularity (e.g., very accurate) such as the latitudinal-longitudinal geodetic coordinates of the mobile computing device 102. Another application 202, however, may only be authorized to access location data of the mobile computing device 102 having coarse granularity (e.g., not accurate) such as the township, city, state, or country in which the mobile computing device 102 is located. The number of levels of specificity and the granularity of each level may vary depending on the particular embodiment. Table 2 shows a sample embodiment of the location access policy 122 identifying the level of specificity by which the application 202 may obtain the location of the mobile computing device 102.

TABLE 2

Location Access Policy Authorizations

| | Application 1 | Application 2 | Application 3 | Application 4 |
|---|---|---|---|---|
| Location 1 | Fine | Fine | Fine | Coarse |
| Location 2 | Coarse | No | No | No |
| Location 3 | No | No | No | No |

Of course, in other embodiments, the location access policy 122 may identify whether the application 202 is authorized to obtain the location of the mobile computing device 102 based on additional or alternative context parameters of the mobile computing device 102 (e.g., time of day, number of location requests, elapsed time since previous location request, type of application, current user, or other context data). Additionally, as discussed in detail below, the location access policy 122 may identify whether the application 202 may obtain network scan data (i.e., data resulting from or otherwise associated with a network scan), which could be used to determine the location of the mobile computing device 102.

The location determination module 212 determines the location of the mobile computing device 102, which may be used to determine whether the application 202 is authorized to obtain the location of the mobile computing device 102 as discussed above. The location determination module 212 may use any suitable technologies, algorithms, and/or mechanisms to determine the location of the mobile computing device 102. For example, the location determination module 212 may determine the location of the mobile computing device 102 using the GPS circuitry 124 of the mobile computing device 102. In another embodiment, the location determination module 212 may determine the location of the mobile computing device 102 based on the locations of the access points 106. For example, in some embodiments, the location determination module 212 implements a trilateration algorithm based on the locations of at least three of the access points 106. In another embodiment, the location determination module 212 may implement a fingerprint algorithm based on, for example, one or more prerecorded radio maps of the access points 106.

The communication module 206 handles the communication between the mobile computing device 102 and remote devices (e.g., the access points 106) through the network 104. As discussed above, in some embodiments, the mobile computing device 102 determines the location of the mobile computing device 102 based on the locations of the access points 106. Accordingly, the communication module 206 may receive unique identifiers from a plurality of access points 106 within a communication range of the mobile computing device 102, which may be used to retrieve location data corresponding with the locations of the access points 106. The unique identifier may be embodied as any data that may be used by the mobile computing device 102 to uniquely identify a particular access point 106 (e.g., a media access control (MAC) address or Service Set Identifier (SSID) of the particular access point 106). In other embodiments, the communication module 206 may receive other information that may be used to identify the location of the mobile computing device 102 (e.g., the received signal strength indication (RSSI) of remote devices such as the access points 106). Alternatively, as discussed above, the communication module 206 may communicate, for example, with satellites to determine the location of the mobile computing device 102 via a GPS system.

Figure 3:
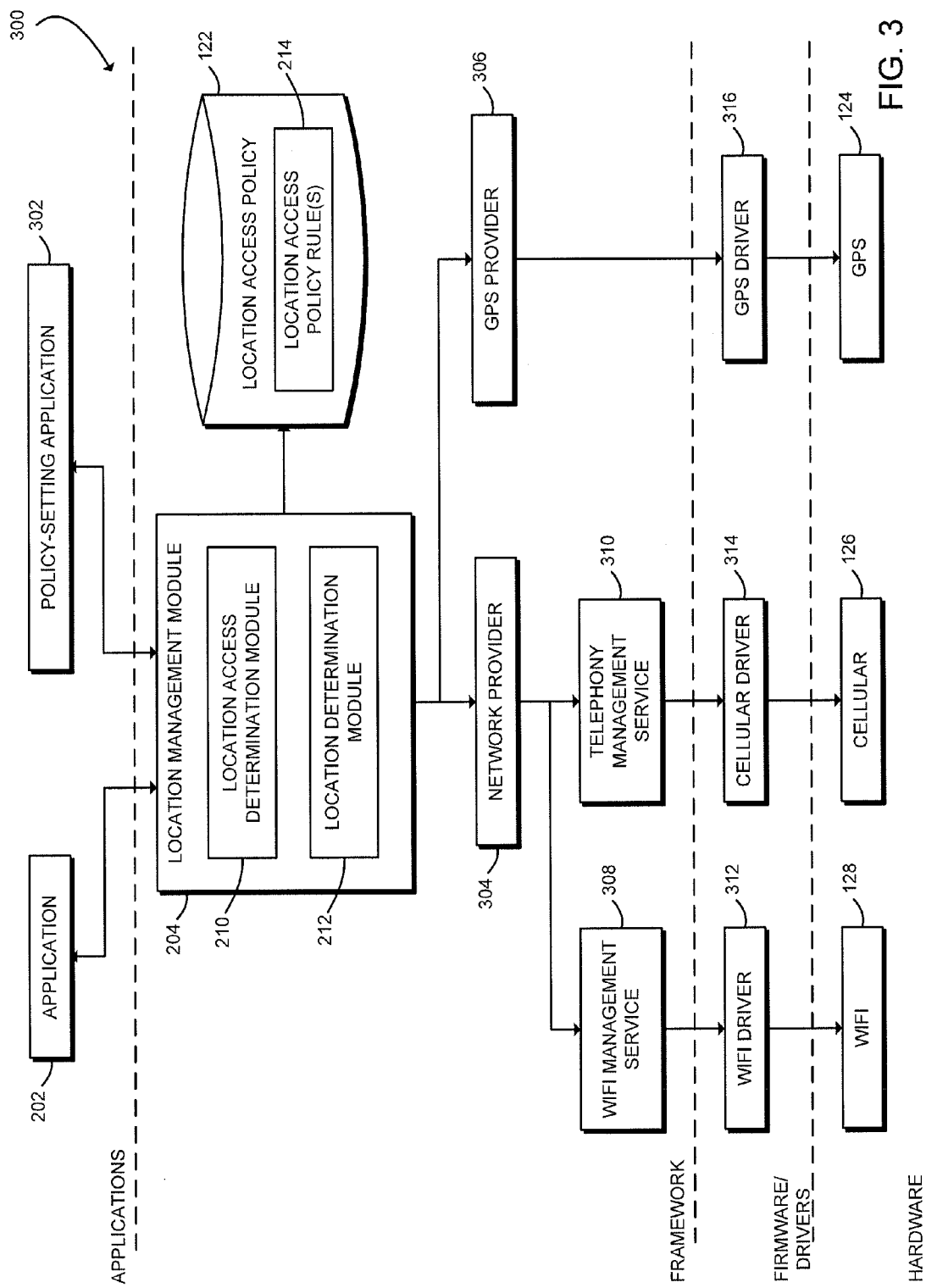
FIG. 3 is a simplified block diagram of at least one implementation of the environment of FIG. 2.
Figure 4:
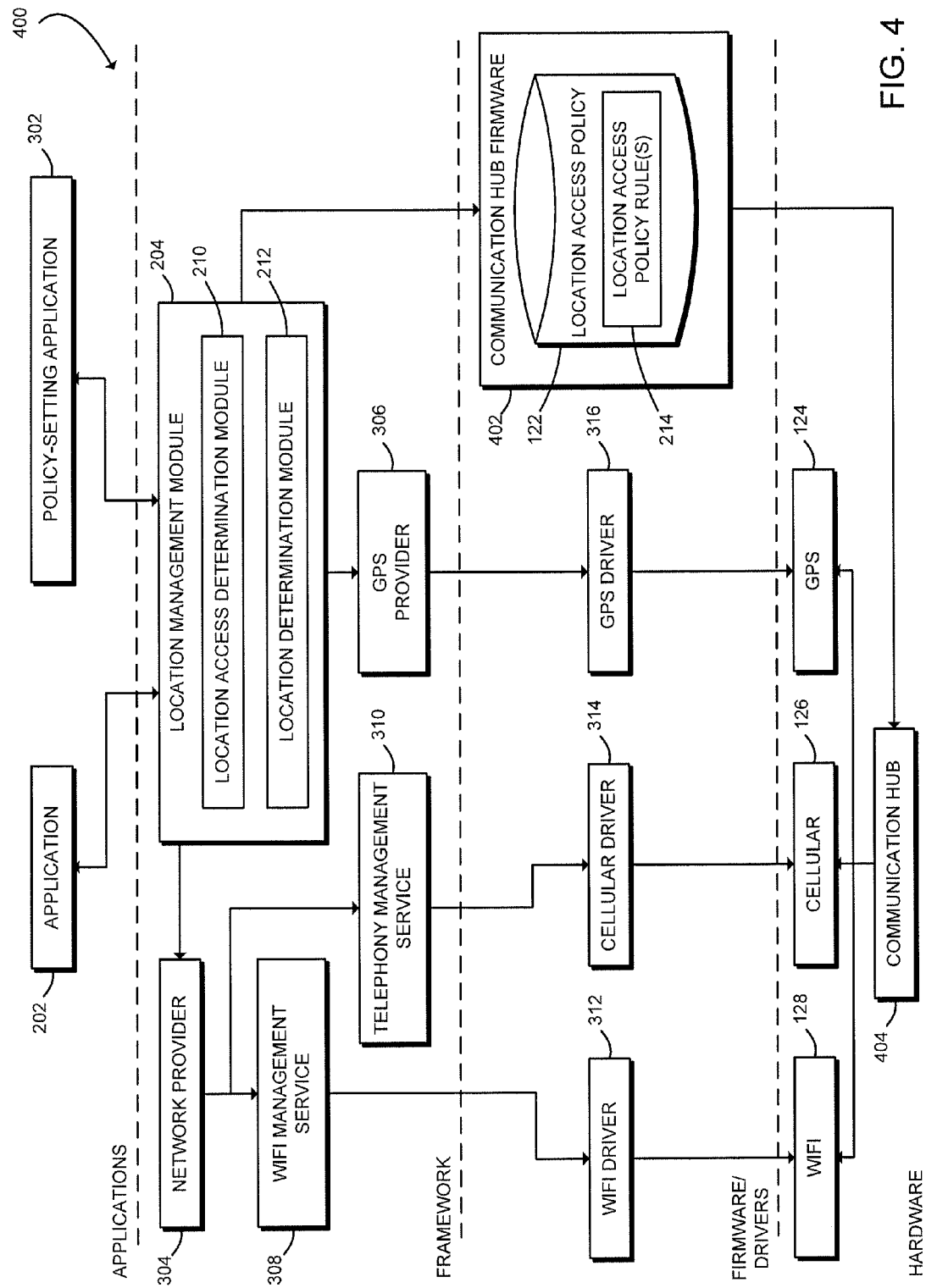
FIG. 4 is a simplified block diagram of at least one other implementation of the environment of FIG. 2.

As shown in FIGS. 3-4, the mobile computing device 102 of the system 100 may implement environments 300, 400 for location privacy management. Referring now to FIG. 3, the environment 300 includes an application layer, a framework layer, a firmware and/or drivers layer, and a hardware layer. As discussed above, the application 202 may request the location of the mobile computing device 102. The location management module 204 determines whether the application 202 is authorized to obtain the requested location data (i.e., the location of the mobile computing device 102 at the requested granularity, etc.) based on the location access policy 122 and the location of the mobile computing device 102.

A user of the mobile computing device 102 may use a policy-setting application 302 (e.g., via a user interface) to establish the conditions under which various applications 202 may obtain the location data of the mobile computing device 102. For example, the user may define protected areas (i.e., locations of the mobile computing device 102 in which a particular application 202 is unauthorized to access the location). In doing so, the user may define the protected areas individually or as a collection of locations. Further, depending on the embodiment, the protected areas may be defined geodetically (e.g., latitudinal-longitudinal geodetic coordinates) or with references to landmarks (e.g., home, all Starbucks cafes in Silicon Valley, etc.). It should be appreciated that the policy-setting application 302 may be embodied as an application similar to the application 202. That is, in some embodiments, the policy-setting application 302 may be embodied as an internet browser application, a browser plug-in, or a standalone application running on the mobile computing device 102.

The network provider 304 and the GPS provider 306 manage the location data received from the corresponding hardware. That is, the network provider 304 manages the location data from the cellular circuitry 126 and the Wi-Fi circuitry 128, whereas the GPS provider 306 manages the location data from the GPS circuitry 124. In doing so, the network provider 304 may connect to a proprietary service (e.g., an Android service). Further, the network provider 304 may utilize a Wi-Fi management service 308 to interact with the Wi-Fi circuitry 128 and a telephony management service 310 to interact with the cellular circuitry 126. As shown in FIG. 3, a Wi-Fi driver 312, a cellular driver 314, and a GPS driver 316 interface with the corresponding hardware of the mobile computing device 102.

Referring now to FIG. 4, the mobile computing device 102 may implement the environment 400 in the firmware layer. It should be appreciated that by implementing the location privacy management system in firmware of the mobile computing device 102, security and/or efficiency of the location privacy management system may be improved. As shown in FIG. 4, the environment 400 includes modules similar to those modules described above with regard to the environment 300 of FIG. 3. The description of the modules of the environment 300 is equally applicable to the description of the modules of the environment 400 and is not repeated herein for clarity of the description. Additionally, the mobile computing device 102 includes a communication hub 404, which is communicatively coupled to the Wi-Fi circuitry 128, the cellular circuitry 126, and the GPS circuitry 124. The location management module 204 may communicate with the communication hub 404 and the other communication circuitry 118 via a communication hub firmware 402. Additionally, as shown in FIG. 4, the location access policy 122 is located in the communication hub firmware 402 in the driver/firmware layer.

Figure 5:
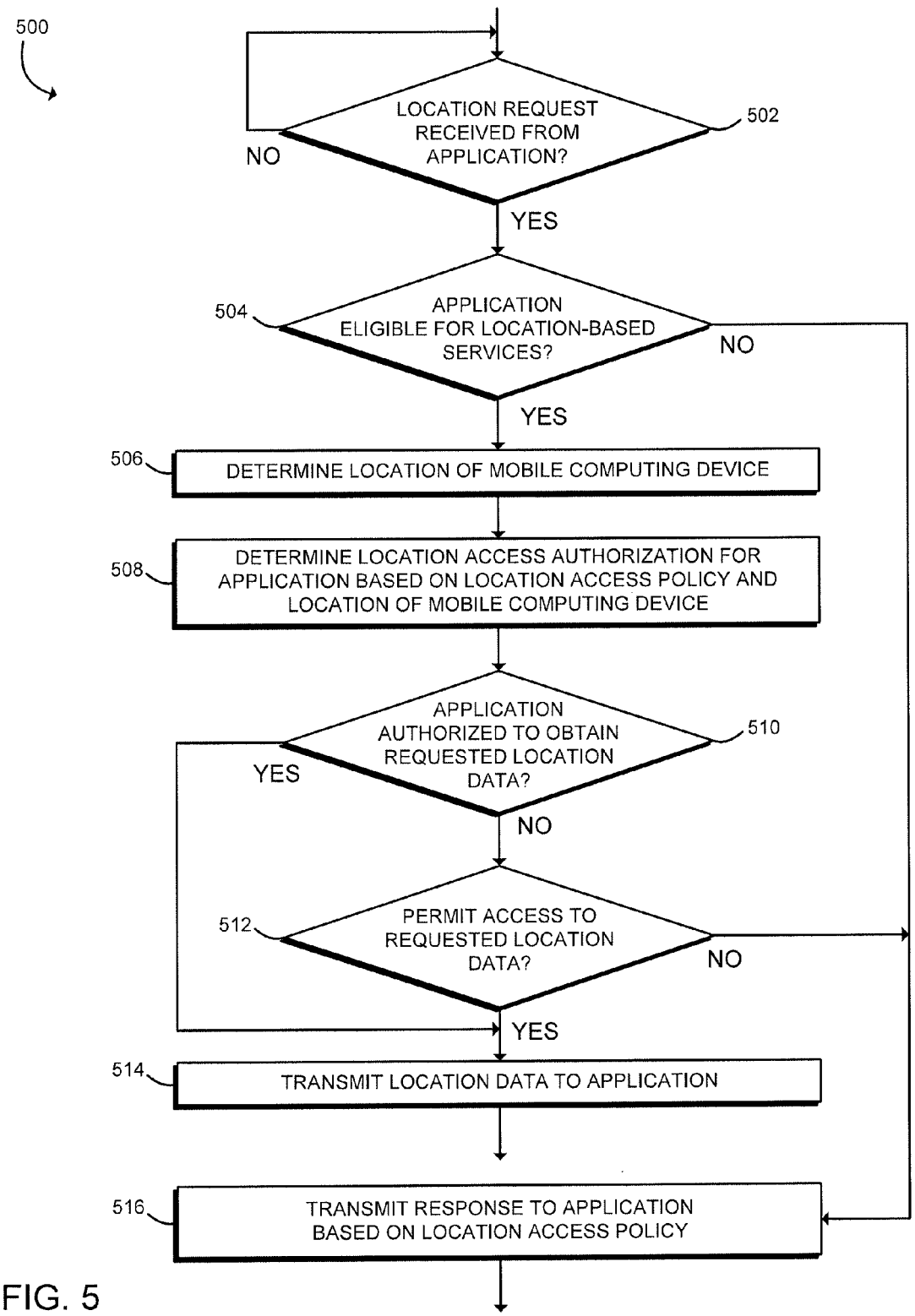
FIG. 5 is a simplified flow diagram of at least one embodiment of a method for managing location privacy on the mobile computing device of the system of FIG. 1.

Referring now to FIG. 5, in use, the mobile computing device 102 of the system 100 may execute a method 500 for managing location privacy. The illustrative method 500 begins with block 502 in which the mobile computing device 102 determines whether a request for the location of the mobile computing device 102 has been received from an application 202. The mobile computing device 102 may identify direct requests for the location of the mobile computing device 102 (e.g., requests for latitudinal-longitudinal geodetic coordinates) and/or indirect requests (e.g., requests to perform a network scan) for the location of the mobile computing device 102. If a location request has been received, the mobile computing device 102 determines whether the requesting application 202 is eligible for location-based services in block 504. In other words, the mobile computing device 102 determines whether the application 202 is one that, under any circumstances, may be permitted to access the location of the mobile computing device 102.

If the application 202 is not eligible for location-based services, in block 516, the mobile computing device 102 transmits a response (e.g., a default or standard response) to the application 202 based on the location access policy 122. The particular response given to the application 202 may be statically or dynamically determined based on the location access policy 122 and may vary depending on the particular embodiment. In one embodiment, the mobile computing device 102 may block the application 202 and notify the application 202 that the location request has been denied or provide no response at all to the application 202. In another embodiment, the mobile computing device 102 may prompt the user (e.g., via a policy-setting application 302) with an opportunity to modify the location access policy rules 214 of the location access policy 122 for the requesting application 202. For example, the user may modify the location access policy 122 to permanently or temporarily (e.g., for a specified period of time or specified number of location requests) authorize the application 202 to obtain location data of the mobile computing device 102. Alternatively, the user may deny the location request and instruct the mobile computing device 102 not to prompt the user regarding the application 202 again in the future. In yet another embodiment, the user may assign future decision-making duties regarding the application 202 to another application of the mobile computing device 102 (e.g., a security or anti-virus application).

Returning to block 504, if the mobile computing device 102 determines that the location-requesting application 202 is eligible for location-based services, the mobile computing device 102 determines the location of the mobile computing device 102. It should be appreciated that, in doing so, the mobile computing device 102 may use any suitable technologies, algorithms, techniques, and mechanisms. As discussed above, the mobile computing device 102 may use, for example, the GPS circuitry 124 to determine the location of the mobile computing device 102. In another embodiment, the mobile computing device 102 may identify the locations of access points 106 within a communication range of the mobile computing device 102 and use those locations (e.g., via trilateration) to determine the location of the mobile computing device 102.

In block 508, the mobile computing device 102 determines the location access authorization for the application 202 based on the location access policy 122 and the determined location of the mobile computing device 102. That is, the mobile computing device 102 determines whether the application 202 is authorized to obtain the location of the mobile computing device 102 while the mobile computing device 102 is at that location. Additionally, as discussed above, the location access policy 122 may identify a level of specificity of the location data that the application 202 is authorized to access/obtain. For example, the application 202 may be authorized to obtain an exact or accurate location of the mobile computing device 102 (e.g., latitudinal-longitudinal geodetic coordinates), an approximate location of the mobile computing device 102 (e.g., the city in which the mobile computing device 102 is located), or location data defined by some other suitable level of specificity depending on the particular embodiment and the location access policy 122. It should be appreciated that, in some embodiments, a particular application 202 may be authorized to obtain location data defining the location of the mobile computing device 102 at a first level of specificity (e.g., coarse granularity) but unauthorized to obtain location data defining the location of the mobile computing device 102 at a second level of specificity (e.g., fine granularity). In other words, the application 202 may attempt to obtain location data defining the location of the mobile computing device 102 more accurately and/or precisely than the application 202 is authorized by the location access policy 122 to obtain. Of course, in other embodiments, the mobile computing device 102 may determine the location access authorization for the application 202 based on the location access policy 122 and/or other context parameters of the mobile computing device 102 as discussed above. Additionally, in some embodiments, block 506 may occur after or contemporaneously with block 508. Further, in some embodiments in which other context parameters are included in the location access policy 122, the location of the mobile computing device 102 may not be determined until the application 202 has been authorized to obtain the location.

In block 510, the mobile computing device 102 determines whether the application 202 is authorized to obtain the requested location data. If so, the mobile computing device 102 transmits the requested location data to the application 202 in block 514. However, if the application 202 is unauthorized to obtain the requested location data, the mobile computing device 102 determines whether to permit the application 202 to access the requested location data in block 512. That is, the mobile computing device 102 may (e.g., based on user input) override the location access policy 122 to permit the application 202 to access the requested location data. For example, the location access policy 122 may only permit a particular application 202 to access location data defining the location of the mobile computing device 102 at coarse granularity, but the user may want to permanently or temporarily allow the application 202 to access location data defining the location of the mobile computing device 102 at fine granularity (e.g., for satellite navigation while driving). Accordingly, the mobile computing device 102 transmits the location data to the application 202 in block 514.

If the mobile computing device 102 determines not to permit the application 202 to access the requested location data, the mobile computing device 102 transmits a response (e.g., a standard or default response) to the application 202 based on the location access policy 122 in block 516. In other words, if the mobile computing device 102 determines that the application 202 is eligible for location-based services but not authorized to obtain the requested location data based on the location access policy 122, the mobile computing device 102 may transmit a response to the application 202 based on the location access policy 122 similar to the response discussed above in reference to block 516. The response to an application 202 eligible for location-based services may include a variety of information depending on the particular embodiment. For example, as discussed above, the mobile computing device 102 may return nothing to the application 202 or notify the application 202 that it is unauthorized to obtain the requested location data. In another embodiment, if the application 202 was previously authorized to access the requested location data of the mobile computing device 102, the mobile computing device 102 may provide the application 202 with the location data of the mobile computing device 102 associated with a point in time when the application 202 was last authorized to obtain the location data. In yet another embodiment, the mobile computing device 102 may provide the application 202 with a static or dynamic mock location (e.g., fake latitudinal-longitudinal geodetic coordinates). Further, the mobile computing device 102 may provide the application 202 with a mock location near the actual location of the mobile computing device 102. For example, the mock location may be the actual location offset by a particular distance in a random direction. Alternatively, the mock location may be the center of the nearest city to the mobile computing device 102. Of course, in other embodiments, the mobile computing device 102 may provide the application 202 with different information.

Figure 6:
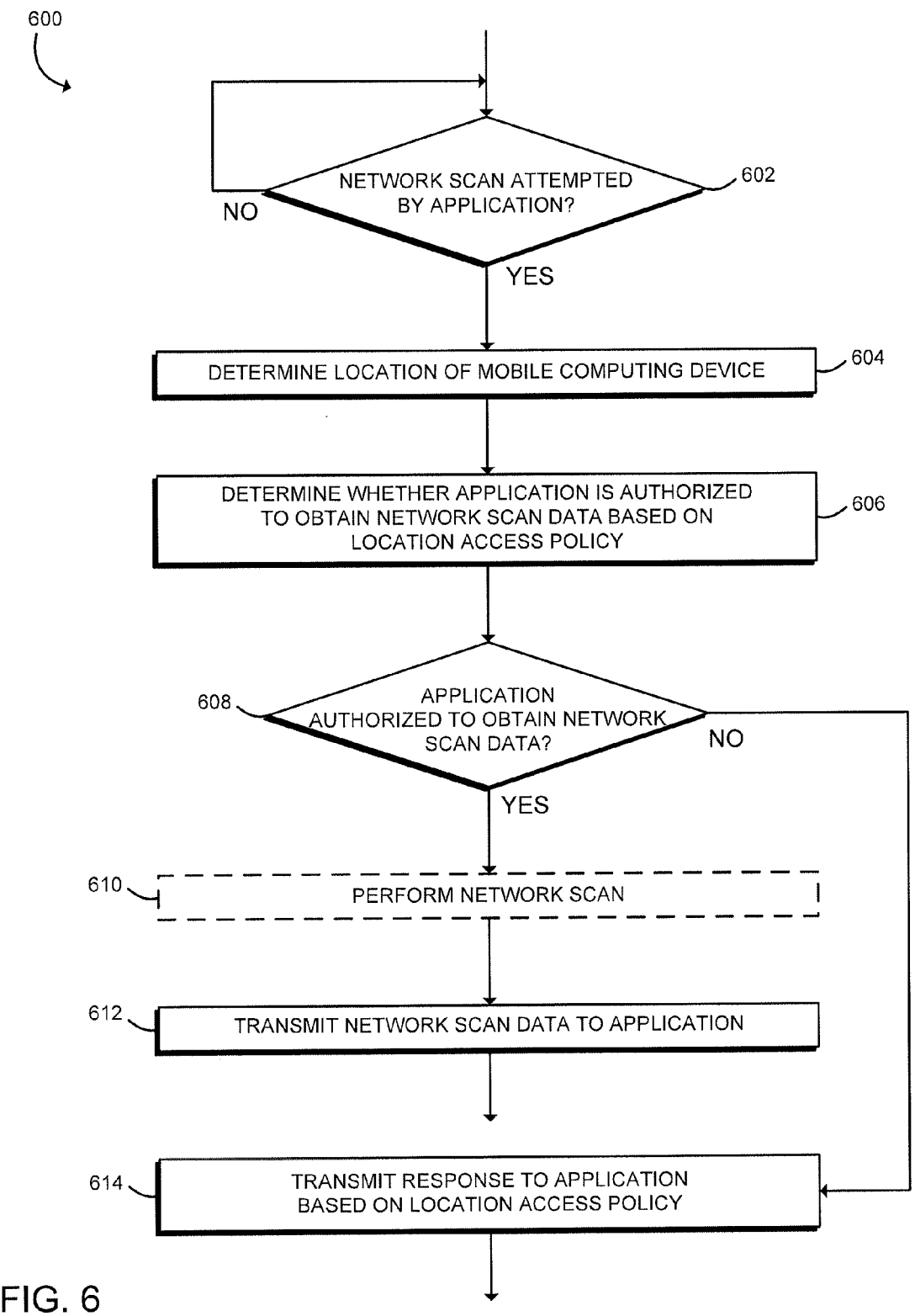
FIG. 6 is a simplified flow diagram of at least one embodiment of a method for managing network scan data on the mobile computing device of the system of FIG. 1.

Referring now to FIG. 6, in use, the mobile computing device 102 of the system 100 may execute a method 600 for managing network scan data. The illustrative method 600 begins with block 602 in which the mobile computing device 102 determines whether the application 202 has attempted to perform a network scan and/or the application 202 has otherwise requested network scan data (i.e., data resulting from or otherwise associated with a network scan). In other words, the mobile computing device 102 determines whether the application 202 has attempted to communicate with the access points 106 in a communication range of the mobile computing device 102 or otherwise access/obtain network scan data. As indicated above, the network scan data may include the locations of the access points 106 or include information (e.g., MAC addresses, SSIDs, RSSI, and other access point 106 or location identifying information) that may be used to determine the locations of the access points 106. Armed with the locations of the access points 106, the application 202 may be able to determine the location of the mobile computing device 102 (e.g., via trilateration or fingerprint).

If the application 202 has attempted to perform a network scan or obtain network scan data, the mobile computing device 102 determines the location of the mobile computing device 102 in block 604. As described above with regard to block 506 of FIG. 5, the mobile computing device 102 may use any suitable technologies, algorithms, techniques, and mechanisms for doing so. In block 606, the mobile computing device 102 determines whether the application 202 is authorized to obtain network scan data based on the location access policy 122. In some embodiments, the location access policy 122 may specifically address whether the application 202 is authorized to obtain network scan data. Further, the application 202 may be authorized to access certain network scan data (e.g., Wi-Fi scan data) and not other network scan data in some embodiments. In other embodiments, the mobile computing device 102 may determine whether the application 202 is authorized to obtain network scan data based on the location data that the application 202 is authorized/unauthorized to obtain under the location access policy 122. For example, the location access policy 122 may indicate that the application 202 is authorized to access location data having coarse granularity (e.g., the city in which the mobile computing device 102 is located) but not the actual location of the mobile computing device 102. In such an embodiment, the mobile computing device 102 may determine that the application 202 is unauthorized to obtain network scan data, because the network scan data could be used to obtain location data more accurate than the authorized level of specificity of location data (i.e., coarse granularity).

If the mobile computing device 102 determines, in block 608, that the application 202 not authorized to obtain the requested network scan data, the mobile computing device 102 transmits a response to the application 202 based on the location access policy 122 in block 614. It should be appreciated that the response may be similar to the response discussed above with regard to block 516 of FIG. 5. For example, the mobile computing device 102 may ignore (i.e., not respond to) the application 202, notify the application 202 that it is unauthorized to access the requested network scan data, and/or provide the application 202 with incorrect network scan data. However, if the mobile computing device 102 determines that the application 202 is authorized to obtain the requested network scan data, the mobile computing device 102 may perform a network scan in block 610 to obtain current network scan data. Of course, if the mobile computing device 102 already has network scan data available, the mobile computing device 102 may not perform the network scan. For example, the mobile computing device 102 may have determined the location of the mobile computing device 102 in block 604 based on the network scan data and, therefore, have network scan data available. In block 612, the mobile computing device 102 transmits the network scan data to the application 202.

Although the technologies disclosed herein have been described with regard to an application 202 executed on the mobile computing device 102, the application 202 may be embodied as other types of software "applications" in other embodiments including, but not limited to, firmware executed on the mobile computing device 102. Additionally, in some embodiments, the requesting "application" 202 may be embodied as a hardware device or combination of hardware and software/firmware. Yet further, in some embodiments, the requesting "application" 202 may be embodied as an software and/or hardware remote from the computing device 102, such as a separate, remote computing device. In such embodiments, the requests received from the remote computing device may be handled on the mobile computing device 102 by a corresponding application or other software and/or hardware. Accordingly, it should be appreciated that the application 202 discussed above is not limited to applications executed in an operation system.

EXAMPLES

Illustrative examples of the technologies disclosed herein are provided below. An embodiment of the technologies may include any one or more, and any combination of, the examples described below.

Example 1 includes a mobile computing device for location privacy management, the mobile computing device comprising a location management module to (i) determine whether an application is authorized to obtain the location of the mobile computing device based on a determined location and a location access policy of the mobile computing device, wherein the location access policy comprises policy rules that identify whether the application is authorized to obtain the location of the mobile computing device, and (ii) block the application from obtaining the location of the mobile computing device in response to a determination that the application is not authorized to obtain the location.

Example 2 includes the subject matter of Example 1, and wherein to determine whether the application is authorized to obtain the location of the mobile computing device comprises to determine whether an application is authorized to obtain a location of an access point.

Example 3 includes the subject matter of any of Examples 1 and 2, and wherein to determine whether the application is authorized to obtain the location of the access point comprises to determine whether an application is authorized to obtain at least one of a name, a unique identifier, or a received signal strength of an access point.

Example 4 includes the subject matter of any of Examples 1-3, and wherein the location management module is to determine, in response to an attempt by the application to perform a network scan for access points within a communication range of the mobile computing device, whether the application is authorized to obtain the location of the mobile computing device.

Example 5 includes the subject matter of any of Examples 1-4, and wherein the location management module is to determine whether the application is authorized to obtain the location of the mobile computing device in response to receipt of a request for the location of the mobile computing device by the application.

Example 6 includes the subject matter of any of Examples 1-5, and wherein the location management module is to determine whether the application is authorized to obtain the location of the mobile computing device in response to a determination that the application is eligible for location-based services.

Example 7 includes the subject matter of any of Examples 1-6, and wherein the location management module is to determine a location of the mobile computing device, and wherein the location is the determined location.

Example 8 includes the subject matter of any of Examples 1-7, and further including a communication module to transmit location data to the application in response to a determination that the application is authorized to obtain the location, wherein the location data identifies the location of the mobile computing device.

Example 9 includes the subject matter of any of Examples 1-8, and wherein the policy rules identify a level of specificity at which the application is authorized to obtain the location of the mobile computing device.

Example 10 includes the subject matter of any of Examples 1-9, and wherein the location access policy comprises a first policy rule that identifies a first application as being authorized to obtain the location of the mobile computing device at a first level of specificity; and a second policy rule that identifies a second application as being authorized to obtain the location of the mobile computing device at a second level of specificity different from the first level of specificity.

Example 11 includes the subject matter of any of Examples 1-10, and wherein the location access policy comprises a third policy rule that identifies a third application that is not authorized to obtain the location of the mobile computing device.

Example 12 includes the subject matter of any of Examples 1-11, and wherein the location management module is to block the application from obtaining the location of the mobile computing device at a requested level of specificity in response to a determination that the application is not authorized to obtain the location at the requested level of specificity.

Example 13 includes the subject matter of any of Examples 1-12, and further including a communication module to transmit a default response to the application in response to a determination of the location management module to block the application from obtaining the location of the mobile computing device, wherein the default response is defined by the location access policy.

Example 14 includes a method for managing location privacy on a mobile computing device, the method comprising determining, on the mobile computing device, whether an application is authorized to obtain the location of the mobile computing device based on a determined location and a location access policy of the mobile computing device, the location access policy comprising policy rules identifying whether the application is authorized to obtain the location of the mobile computing device; blocking, on the mobile computing device, the application from obtaining the location of the mobile computing device in response to determining that the application is not authorized to obtain the location.

Example 15 includes the subject matter of Example 14, and wherein determining whether the application is authorized to obtain the location of the mobile computing device comprises determining whether an application is authorized to obtain a location of an access point.

Example 16 includes the subject matter of any of Examples 14 and 15, and wherein determining whether the application is authorized to obtain the location of the access point comprises determining whether an application is authorized to obtain at least one of a name, a unique identifier, or a received signal strength of an access point.

Example 17 includes the subject matter of any of Examples 14-16, and wherein determining whether the application is authorized to obtain the location of the mobile computing device comprises determining, in response to an attempt by the application to perform a network scan for access points within a communication range of the mobile computing device, whether the application is authorized to obtain the location of the mobile computing device.

Example 18 includes the subject matter of any of Examples 14-17, and wherein determining whether the application is authorized to obtain the location of the mobile computing device comprises determining whether the application is authorized to obtain the location of the mobile computing device in response to receiving, with the mobile computing device, a request for the location of the mobile computing device by the application.

Example 19 includes the subject matter of any of Examples 14-18, and wherein determining whether the application is authorized to obtain the location of the mobile computing device comprises determining whether the application is authorized to obtain the location of the mobile computing device in response to determining, on the mobile computing device, that the application is eligible for location-based services.

Example 20 includes the subject matter of any of Examples 14-19, and further including determining, on the mobile computing device, a location of the mobile computing device, the location being the determined location.

Example 21 includes the subject matter of any of Examples 14-20, and further including transmitting, from the mobile computing device, location data to the application in response to determining that the application is authorized to obtain the location, the location data identifying the location of the mobile computing device.

Example 22 includes the subject matter of any of Examples 14-21, and wherein the policy rules identify a level of specificity at which the application is authorized to obtain the location of the mobile computing device.

Example 23 includes the subject matter of any of Examples 14-22, and wherein the location access policy comprises a first policy rule identifying a first application as being authorized to obtain the location of the mobile computing device at a first level of specificity; and a second policy rule identifying a second application as being authorized to obtain the location of the mobile computing device at a second level of specificity different from the first level of specificity.

Example 24 includes the subject matter of any of Examples 14-23, and wherein the location access policy comprises a third policy rule identifying a third application that is not authorized to obtain the location of the mobile computing device.

Example 25 includes the subject matter of any of Examples 14-24, and wherein blocking the application from obtaining the location of the mobile computing device comprises blocking the application from obtaining the location of the mobile computing device at a requested level of specificity in response to a determining that the application is not authorized to obtain the location at the requested level of specificity.

Example 26 includes the subject matter of any of Examples 14-25, and further including transmitting, from the mobile computing device, a default response to the application in response to determining to block the application from obtaining the location of the mobile computing device, the default response being defined by the location access policy.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device for managing location privacy, the computing device comprising means for performing the method of any of Examples 14-26.

The invention claimed is:

1. A mobile computing device for location privacy management, the mobile computing device comprising:
   a policy-setting application to store a location access policy, wherein the location access policy comprises one or more predefined policy rules that identify whether an application is authorized to obtain the location of the mobile computing device, and wherein the predefined policy rules include a preset condition defined by a user;
   a location management module to (i) determine, in response to storage of the location access policy, whether the application executed by the mobile computing device is authorized to obtain the location of the mobile computing device based on the application, a determined location, and the location access policy stored on the mobile computing device, and (ii) block the application from obtaining the location of the mobile computing device in response to a determination that the application is not authorized to obtain the location.

2. The mobile computing device of claim 1, wherein to determine whether the application is authorized to obtain the location of the mobile computing device comprises to determine whether an application is authorized to obtain a location of an access point.

3. The mobile computing device of claim 2, wherein to determine whether the application is authorized to obtain the location of the access point comprises to determine whether an application is authorized to obtain at least one of a name, a unique identifier, or a received signal strength of an access point.

4. The mobile computing device of claim 1, wherein the location management module is to determine, in response to an attempt by the application to perform a network scan for access points within a communication range of the mobile computing device, whether the application is authorized to obtain the location of the mobile computing device.

5. The mobile computing device of claim 1, wherein the location management module is to determine whether the application is authorized to obtain the location of the mobile computing device in response to receipt of a request for the location of the mobile computing device by the application.

6. The mobile computing device of claim 1, further comprising a communication module to transmit location data to the application in response to a determination that the application is authorized to obtain the location, wherein the location data identifies the location of the mobile computing device.

7. The mobile computing device of claim 1, wherein the predefined policy rules identify a level of specificity at which the application is authorized to obtain the location of the mobile computing device.

8. The mobile computing device of claim 7, wherein the location access policy comprises:
   a first policy rule that identifies a first application as being authorized to obtain the location of the mobile computing device at a first level of specificity; and
   a second policy rule that identifies a second application as being authorized to obtain the location of the mobile computing device at a second level of specificity different from the first level of specificity.

9. The mobile computing device of claim 8, wherein the location access policy comprises a third policy rule that identifies a third application that is not authorized to obtain the location of the mobile computing device.

10. The mobile computing device of claim 7, wherein the location management module is to block the application from obtaining the location of the mobile computing device at a requested level of specificity in response to a determination that the application is not authorized to obtain the location at the requested level of specificity.

11. The mobile computing device of claim 1, further comprising a communication module to transmit a default response to the application in response to a determination of the location management module to block the application from obtaining the location of the mobile computing device, wherein the default response is defined by the location access policy.

12. One or more non-transitory, machine readable storage media comprising a plurality of instructions stored thereon that, in response to execution by a mobile computing device, cause the mobile computing device to:
   store a location access policy, the location access policy comprising one or more predefined policy rules that identify whether an application is authorized to obtain the location of the mobile computing device, and wherein the predefined policy rules include a preset condition defined by a user;
   determine, in response to storing the location access policy, whether the application executed by the mobile computing device is authorized to obtain the location of the mobile computing device based on the application, a determined location, and the location access policy stored on the mobile computing device; and
   block the application from obtaining the location of the mobile computing device in response to a determination that the application is not authorized to obtain the location.

13. The one or more non-transitory, machine readable storage media of claim 12, wherein to determine whether the application is authorized to obtain the location of the mobile computing device comprises to determine whether an application is authorized to obtain a location of an access point.

14. The one or more non-transitory, machine readable storage media of claim 12, wherein to determine whether the application is authorized to obtain the location of the mobile computing device comprises to determine, in response to an attempt by the application to perform a network scan for access points within a communication range of the mobile computing device, whether the application is authorized to obtain the location of the mobile computing device.

15. The one or more non-transitory, machine readable storage media of claim 12, wherein to determine whether the application is authorized to obtain the location of the mobile computing device comprises to determine whether the application is authorized to obtain the location of the mobile computing device in response to receipt of a request for the location of the mobile computing device by the application.

16. The one or more non-transitory, machine readable storage media of claim 12, wherein to determine whether the application is authorized to obtain the location of the mobile computing device comprises to determine whether the application is authorized to obtain the location of the mobile computing device in response to a determination that the application is eligible for location-based services.

17. The one or more non-transitory, machine readable storage media of claim 12, wherein the plurality of instructions further cause the mobile computing device to determine a location of the mobile computing device, the location being the determined location.

18. The one or more non-transitory, machine readable storage media of claim 12, wherein the predefined policy rules identify a level of specificity at which the application is authorized to obtain the location of the mobile computing device.

19. The one or more non-transitory, machine readable storage media of claim 18, wherein the location access policy comprises:
 a first policy rule that identifies a first application as being authorized to obtain the location of the mobile computing device at a first level of specificity; and
 a second policy rule that identifies a second application as being authorized to obtain the location of the mobile computing device at a second level of specificity different from the first level of specificity.

20. The one or more non-transitory, machine readable storage media of claim 19, wherein the location access policy comprises a third policy rule that identifies a third application that is not authorized to obtain the location of the mobile computing device.

21. The one or more non-transitory, machine readable storage media of claim 18, wherein to block the application from obtaining the location of the mobile computing device comprises to block the application from obtaining the location of the mobile computing device at a requested level of specificity in response to a determination that the application is not authorized to obtain the location at the requested level of specificity.

22. The one or more non-transitory, machine readable storage media of claim 12, wherein the plurality of instructions further cause the mobile computing device to transmit a default response to the application in response to a determination to block the application from obtaining the location of the mobile computing device, the default response being defined by the location access policy.

23. A method for managing location privacy on a mobile computing device, the method comprising:
 storing, by the mobile computing device, a location access policy, the location access policy comprising one or more predefined policy rules that identify whether an application is authorized to obtain the location of the mobile computing device, and wherein the predefined policy rules include a preset condition defined by a user;
 determining, by the mobile computing device in response to storing the location access policy, whether the application executed by the mobile computing device is authorized to obtain the location of the mobile computing device based on the application, a determined location, and the location access policy stored on the mobile computing device; and
 blocking, by the mobile computing device, the application from obtaining the location of the mobile computing device in response to determining that the application is not authorized to obtain the location.

24. The method of claim 23, wherein determining whether the application is authorized to obtain the location of the mobile computing device comprises determining, in response to an attempt by the application to perform a network scan for access points within a communication range of the mobile computing device, whether the application is authorized to obtain the location of the mobile computing device.

25. The method of claim 23, wherein the location access policy comprises:
 a first policy rule identifying a first application as being authorized to obtain the location of the mobile computing device at a first level of specificity;
 a second policy rule identifying a second application as being authorized to obtain the location of the mobile computing device at a second level of specificity different from the first level of specificity; and
 a third policy rule identifying a third application that is not authorized to obtain the location of the mobile computing device.

\* \* \* \* \*